(12) United States Patent
Chun (10) Patent No.: US 10,120,548 B2
(45) Date of Patent: *Nov. 6, 2018

(54) METHOD AND APPARATUS FOR PERIPHERAL CONNECTION

(71) Applicant: Samsung Electronics Co., Ltd., Suwon-si, Gyeonggi-do (KR)

(72) Inventor: Young-Soo Chun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

This patent is subject to a terminal disclaimer.

(21) Appl. No.: 15/083,947

(22) Filed: Mar. 29, 2016

(65) Prior Publication Data

US 2016/0210026 A1    Jul. 21, 2016

Related U.S. Application Data

(63) Continuation of application No. 13/679,648, filed on Nov. 16, 2012, now Pat. No. 9,389,772.

(30) Foreign Application Priority Data

Nov. 23, 2011 (KR) ........................ 10-2011-0122820

(51) Int. Cl.
*G06F 3/048* (2013.01)
*G06F 3/0484* (2013.01)
(Continued)

(52) U.S. Cl.
CPC ........ *G06F 3/04842* (2013.01); *G06F 3/0482* (2013.01); *G06F 3/0486* (2013.01);
(Continued)

(58) Field of Classification Search
None
See application file for complete search history.

(56) References Cited

U.S. PATENT DOCUMENTS 6,763,226 B1    7/2004  McZeal, Jr.
7,761,802 B2 *  7/2010  Shah ..................... G06T 11/206
                                                    715/744

(Continued)

FOREIGN PATENT DOCUMENTS

CN    101714055 A         5/2010
KR    10-2009-0132097 A  12/2009
KR    10-2010-0115226 A  10/2010

OTHER PUBLICATIONS

Korean Office Action dated Jan. 16, 2018, issued in Korean Patent Application No. 10-2011-0122820.

(Continued)

*Primary Examiner* — Hua Lu
(74) *Attorney, Agent, or Firm* — Jefferson IP Law, LLP (57) ABSTRACT

Attaching a peripheral device to a portable terminal includes determining one or more application programs operating in connection with an attached peripheral device, displaying a depiction of a plug of the attached peripheral device and the one or more application programs on a screen of the portable terminal, and, when a user drags the displayed depiction of a plug to select one of the one or more application programs, executing the selected application program.

20 Claims, 7 Drawing Sheets

US 10,120,548 B2
Page 2

(51) Int. Cl.
*G06F 3/0486* (2013.01)
*G06F 3/0488* (2013.01)
*G06F 3/0481* (2013.01)
*G06F 3/0482* (2013.01)

(52) U.S. Cl.
CPC ........ *G06F 3/0488* (2013.01); *G06F 3/04817* (2013.01); *G06F 3/04845* (2013.01); *G06F 3/04883* (2013.01); *G06F 3/04886* (2013.01)

(56) References Cited

U.S. PATENT DOCUMENTS

| | | | |
|---|---|---|---|
| 2003/0035009 A1* | 2/2003 | Kodosky | G05B 19/0426 715/771 |
| 2004/0032429 A1* | 2/2004 | Shah | G06F 3/0481 715/771 |
| 2005/0186913 A1 | 8/2005 | Varanda | |
| 2005/0192002 A1 | 9/2005 | Varanda | |
| 2005/0238162 A1 | 10/2005 | Dezonno | |
| 2006/0101116 A1 | 5/2006 | Rittman et al. | |
| 2006/0103590 A1 | 5/2006 | Divon | |
| 2006/0112339 A1 | 5/2006 | Struthers et al. | |
| 2006/0122925 A1 | 6/2006 | Wesby | |
| 2006/0206628 A1* | 9/2006 | Erez | H04N 1/00204 710/8 |
| 2007/0043608 A1 | 2/2007 | May et al. | |
| 2007/0055800 A1* | 3/2007 | Scaffidi, Jr. | G06F 8/62 710/62 |
| 2008/0120668 A1 | 5/2008 | Yau | |
| 2008/0175442 A1 | 7/2008 | Megarry et al. | |
| 2009/0049307 A1 | 2/2009 | Lin | |
| 2009/0055157 A1 | 2/2009 | Soffer | |
| 2009/0063718 A1* | 3/2009 | Sekine | G06F 9/4411 710/8 |
| 2009/0098867 A1 | 4/2009 | Varanda | |
| 2009/0125815 A1* | 5/2009 | Chaudhri | G06F 3/0481 715/740 |
| 2009/0209205 A1 | 8/2009 | Kramer et al. | |
| 2009/0231960 A1 | 9/2009 | Hutcheson | |
| 2009/0271724 A1* | 10/2009 | Chaudhri | G06F 3/0481 715/769 |
| 2010/0011311 A1* | 1/2010 | Kodosky | G05B 19/0426 715/771 |
| 2010/0066677 A1 | 3/2010 | Garrett et al. | |
| 2010/0078751 A1* | 4/2010 | Kim | H01L 27/14634 257/459 |
| 2010/0156913 A1* | 6/2010 | Ortega | G06F 3/1438 345/520 |
| 2010/0233961 A1* | 9/2010 | Holden | G06F 13/385 455/41.3 |
| 2010/0273425 A1 | 10/2010 | Varanda | |
| 2011/0021269 A1 | 1/2011 | Wolff-Peterson et al. | |
| 2011/0181520 A1* | 7/2011 | Boda | G06F 1/1639 345/173 |
| 2011/0252380 A1* | 10/2011 | Chaudhri | G06F 3/04883 715/836 |
| 2011/0289236 A1* | 11/2011 | Kummerli | G06F 3/0481 710/8 |
| 2015/0044996 A1 | 2/2015 | Wesby | |

OTHER PUBLICATIONS

Korean Notice of Patent Grant dated Jul. 26, 2018, issued in Korean Patent Application No. 10-2011-0122820.

* cited by examiner

METHOD AND APPARATUS FOR PERIPHERAL CONNECTION

CROSS-REFERENCE TO RELATED APPLICATION(S) AND CLAIM OF PRIORITY

This application is a continuation application of prior application Ser. No. 13/679,648 filed on Nov. 16, 2012, which claimed the benefit under 35 U.S.C. § 119(a) of a Korean patent application filed on Nov. 23, 2011 in the Korean Intellectual Property Office and assigned Serial No. 10-2011-0122820, the entire disclosure of which is hereby incorporated by reference.

TECHNICAL FIELD

The present disclosure relates generally to peripheral connection, and in particular, to a method and apparatus for attaching a peripheral device.

BACKGROUND

When detecting an attachment of a peripheral device (using a universal serial bus (USB) interface or a headset interface), a portable terminal performs a relevant operation such as electric charge while outputting a detection sound.

However, such a user interface (UI) representing a command/sound that is displayed/outputted when a peripheral device is attached to or detached from a portable terminal is too simple and is not intuitive because the UI is a simple command/sound output indicating the attachment or detachment.

SUMMARY

To address the above-discussed deficiencies, it is a primary object to provide at least the advantages discussed below. Accordingly, an object of the present disclosure is to provide an improved method and apparatus for peripheral connection.

Another object of the present disclosure is to provide a method and apparatus for enabling an intuitive attachment of a peripheral device by using, a graphical user interface (GUI).

Another object of the present disclosure is to provide a method and apparatus for enabling an intuitive detachment of a peripheral device by using a graphical user interface.

According, to an aspect of the present disclosure, a method for attaching a peripheral device includes: determining one or more application programs operating in connection with an attached peripheral device; displaying a plug of the attached peripheral device and the one or more application programs; and when a user drags the plug to select one of the one or more application programs, executing the selected application program.

According to another aspect of the present disclosure, an apparatus operating with a peripheral device attached thereto includes: a peripheral device connecting unit for connecting a peripheral device; and a connection managing unit for determining one or more application programs operating in connection with an attached peripheral device, displaying a plug of the attached peripheral device and the one or more application programs, and executing, when a user drags the plug to select one of the one or more application programs, the selected application program.

According to another aspect of the present disclosure, a method for detaching a peripheral device includes: displaying one or more application programs including an application program to be closed and operating in connection with an attached peripheral device; displaying a plug of the attached peripheral device operating in connection with the application program to be closed; and closing the application program to be closed, when a user drags the plug to separate the plug from the application program to be closed.

According to another aspect of the present disclosure, an apparatus operating with a peripheral device detached therefrom includes: a peripheral device connecting unit for connecting a peripheral device; and a connection managing unit for displaying one or more application programs including an application program to be closed and operating in connection with an attached peripheral device, displaying a plug of the attached peripheral device operating in connection with the application program to be closed, and closing the application program to be closed, when a user drags the plug to separate the plug from the application program to be closed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminal. Exemplary embodiments of the present disclosure will be described herein below with reference to the accompanying drawings. In the following description, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein should be understood based on the descriptions made herein.

Hereinafter, a description will be given of a method and apparatus for peripheral connection according to exemplary embodiments of the present disclosure.

A portable terminal will be described as an example of an apparatus for peripheral connection according to the present disclosure. However, it will be readily understood that an example of the apparatus for peripheral connection is not limited to a portable terminal.

In addition, although a headset interface or a universal serial bus (USB) interface will be described as an example of an interface used by a peripheral device according to the present disclosure, it will be readily understood that the interfaces used by the peripheral device are not limited to a headset interface or a USB interface.

In general, a portable terminal supporting a touchscreen has a USB interface and a headset interface. Also, when a peripheral device using a USB interface or a headset interface is attached to or detached from a portable terminal, an operating system (OS) of the portable terminal may use a general-purpose input/output (GPIO) interface to determine that the peripheral device using a USB interface or a headset interface has been attached to or detached from the portable terminal.

The subject matter of the present disclosure relates to a method and an apparatus for automatically detecting and displaying a peripheral device on a screen of a portable terminal when the peripheral device is connected to the portable terminal, executing a desired application program when a user drags the displayed peripheral device to the desired application program, and releasing the peripheral connection through an inverse process thereof.

Figures 1A, 1B:
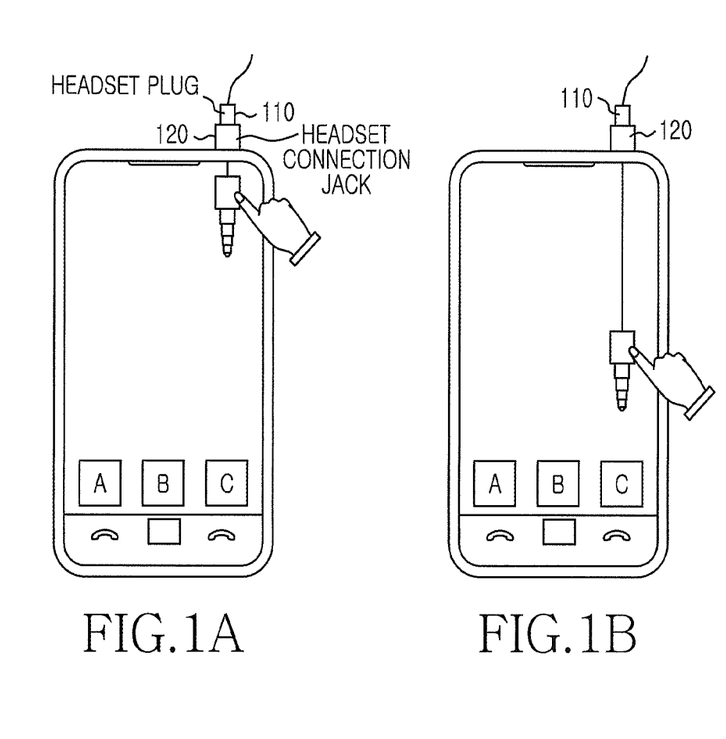
FIGS. 1A through 1C are illustrations of graphical user interface displays during a process of attaching a peripheral device using a headset interface according to an exemplary embodiment of the present disclosure.
Figure 1C:
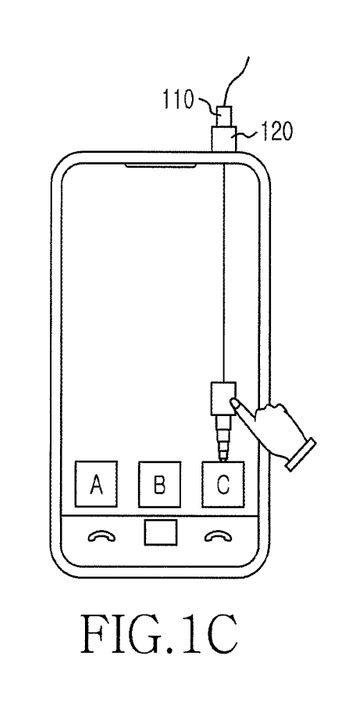

FIGS. 1A through 1C are illustrations of graphical user interface displays during a process of attaching a peripheral device using a headset interface according to an exemplary embodiment of the present disclosure.

Referring to FIG. 1A, when a headset plug 110 using a headset interface is attached to a headset connection jack 120 of a portable terminal, a depiction of a headset connection plug is displayed on a screen of the portable terminal under the headset connection jack 120, and application programs A, B and C using the headset interface are displayed in a bottom region of the screen. In this case, connection paths connecting the displayed headset connection plug respectively to the application programs A, B and C may be displayed on the screen.

Thereafter, when a user drags the displayed depiction of a headset connection plug (FIG. 1B) across the screen to the desired application program C (FIG. 1C), the desired application program C is executed.

In this case, the depiction of a headset connection plug is displayed on the screen according to the movement of the user's finger for a drag operation of the user.

Figure 2A:
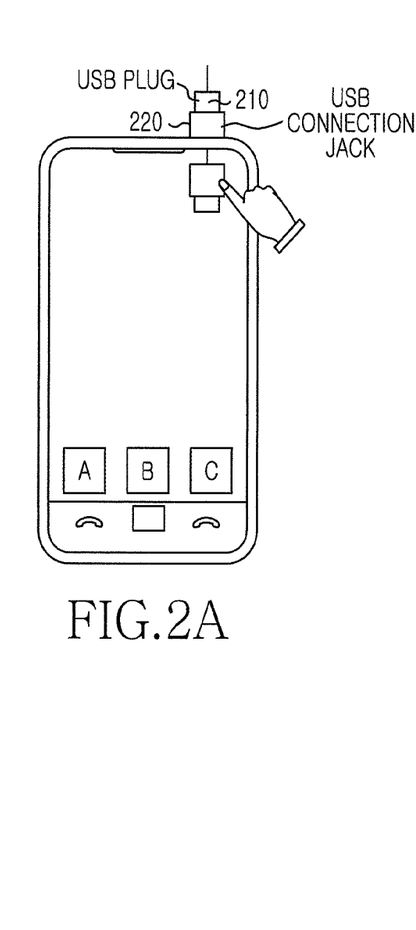
FIGS. 2A through 2C are illustrations of graphical user interface displays during a process of attaching a peripheral device using a USB interface according to an exemplary embodiment of the present disclosure.
Figure 2B:
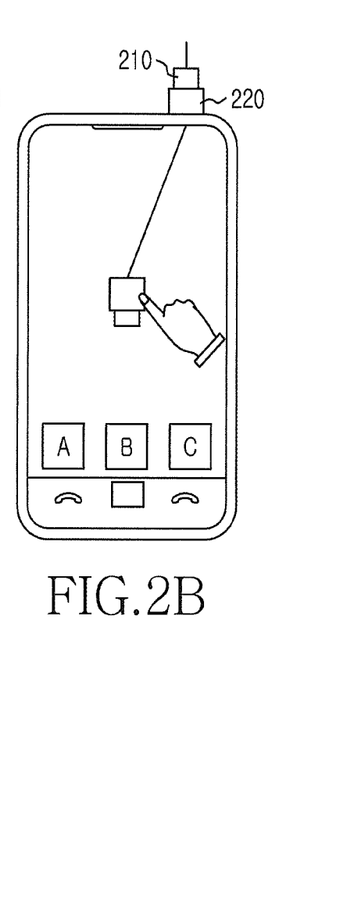
Figure 2C:
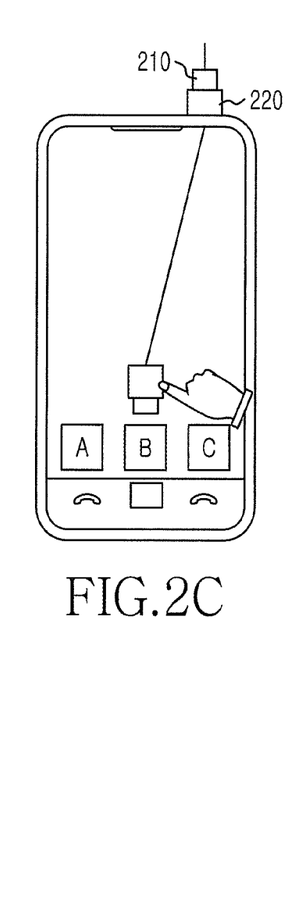

FIGS. 2A through 2C are illustrations of graphical user interface displays during a process of attaching a peripheral device using a USB interface according to an exemplary embodiment of the present disclosure.

Referring to FIG. 2A, when a USB plug 210 using a USB interface is attached to a USB connection jack 220 of a portable terminal, a depiction of a USB connection plug is displayed on a screen of the portable terminal under the USB connection jack 220, and application programs A, B and C using the USB interface are displayed in a bottom region of the screen. In this case, connection paths connecting the displayed depiction of a USB connection plug respectively to the application programs A, B and C may be displayed on the screen.

Thereafter, when a user drags the displayed depiction of a USB connection plug (FIG. 2B) across the screen to the desired application program B (FIG. 2C), the desired application program B is executed.

In this case, the depiction of a USB connection plug is displayed on the screen according to the movement of the user's finger for a drag operation of the user.

Figure 3:
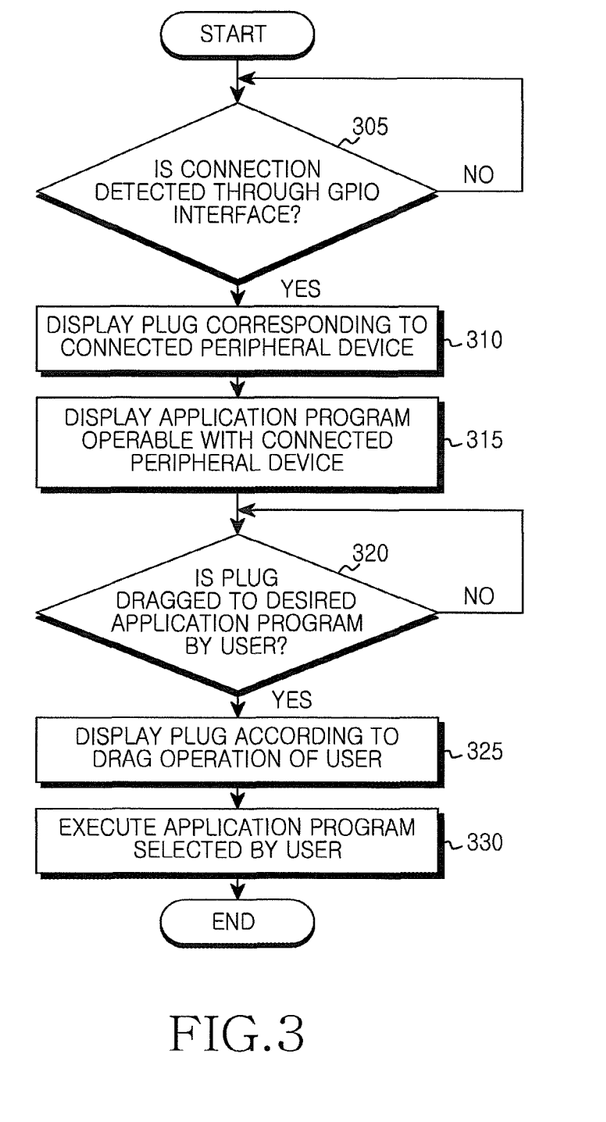
FIG. 3 is a high level flow diagram illustrating the operation of a process in a portable terminal for attaching a peripheral device according to an exemplary embodiment of the present disclosure.

FIG. 3 is a high level flow diagram illustrating the operation of a process in a portable terminal for attaching a peripheral device according to an exemplary embodiment of the present disclosure.

Referring to FIG. 3, when detecting a peripheral attachment through a GPIO interface (in step 305), the portable terminal determines which peripheral device is connected through the GPIO interface.

Thereafter, the portable terminal displays a plug corresponding to the connected peripheral device on the screen (step 310). Thereafter, the portable terminal displays one or more application programs that are operable with the connected peripheral device (step 315).

Thereafter, when the user drags the displayed plug corresponding to the connected peripheral device to a desired application program (step 320), the portable terminal displays the plug according to a drag operation of the user (step 325).

Thereafter, the portable terminal executes the application program that is selected through the drag operation of the user (step 330).

Figure 4A:
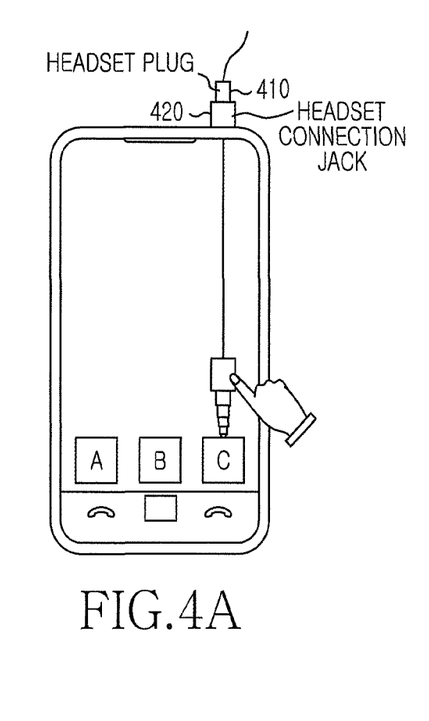
FIGS. 4A through 4C are illustrations of graphical user interface displays during a process of detaching a peripheral device using a headset interface according to an exemplary embodiment of the present invention.
Figure 4B:
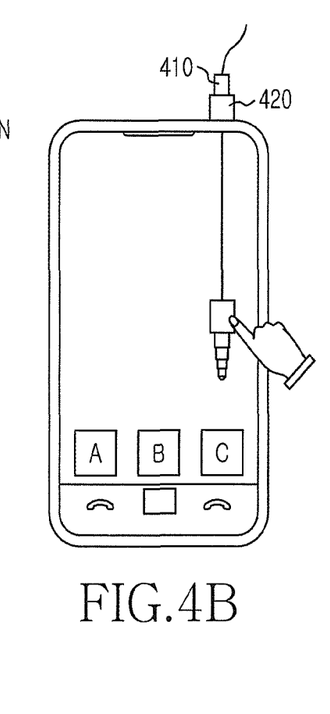
Figure 4C:
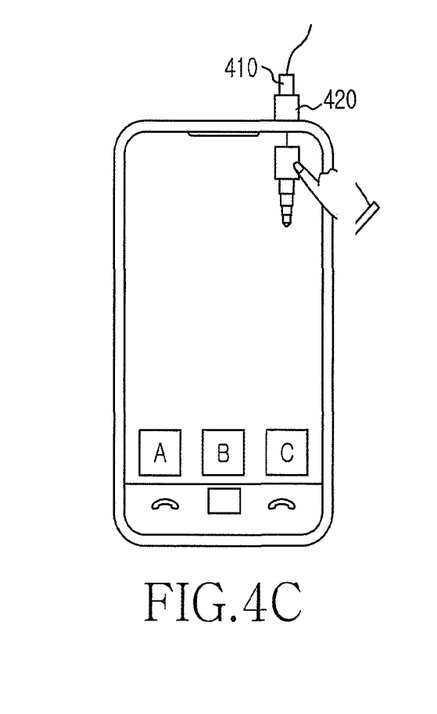

FIGS. 4A through 4C are illustrations of graphical user interface displays during a process of detaching a peripheral device using a headset interface according to an exemplary embodiment of the present disclosure.

Referring to FIG. 4A, when desiring to detach a headset from a portable terminal, or when desiring to close an application program operating in connection with a headset interface, a user selects a user menu for closing the application program or detaching the headset.

When the user menu is selected by the user, an application program C operating with the headset is displayed on a screen of the portable terminal. In this case, other application programs A and B using the headset interface may also be displayed on the screen. When the user selects the application program C operating with the headset, touches a depiction of a headset connection plug connected to the application program C operating with the headset, and drags up the depicted headset connection plug (FIGS. 4B and 4C) to release a connection between the depicted headset connection plug and the application program C, the application program C is closed. Thereafter, the user may detach a headset plug 410 from a headset connection jack 420.

In this case, when the user does not detach the headset plug 410 from the headset connection jack 420 and drags the headset connection plug on the screen to another desired application program (e.g., application program A), the portable terminal may execute the desired application program selected by the user.

Figure 5A:
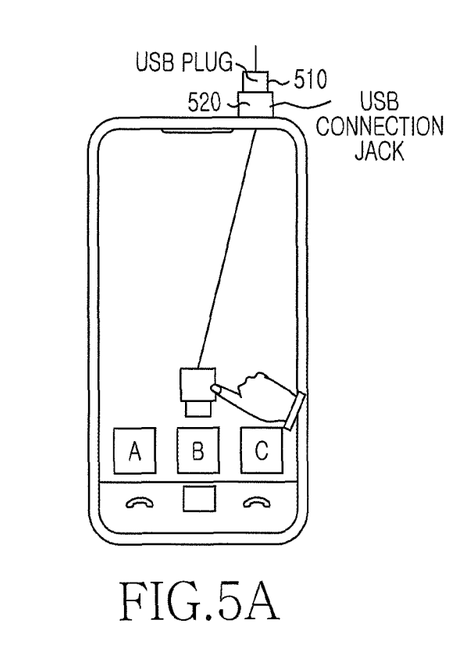
FIGS. 5A through 5C are illustrations of graphical user interface displays during a process of detaching a peripheral device using a USB interface according to an exemplary embodiment of the present disclosure.
Figure 5B:
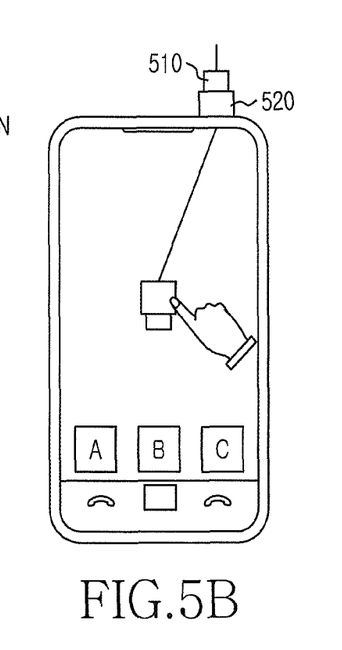
Figure 5C:
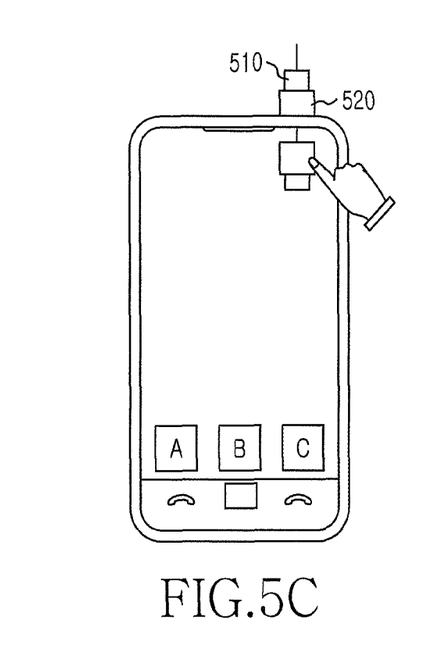

FIGS. 5A through 5C are illustrations of user interface displays during a process of detaching a peripheral device using a USB interface according to an exemplary embodiment of the present disclosure.

Referring to FIG. 5A, when desiring to detach a USB peripheral device from a portable terminal, or when desiring to close an application program operating in connection with a USB interface, a user selects a user menu for closing the application program or detaching the USB peripheral device.

When the user menu is selected by the user, an application program B operating with the USB peripheral device is displayed on a screen of the portable terminal. In this case, other application programs A and C using the USB interface may also be displayed on the screen.

When the user selects the application program B operating with the USB peripheral device, touches a depiction of a USB connection plug connected to the application program B operating with the USB peripheral device, and drags up the USB connection plug (FIGS. 5B and 5C) to release a connection between the USB connection plug and the application program B, the application program B is closed. Thereafter, the user may detach a USB plug 510 from a USB connection jack 520.

In this case, when the user does not detach the USB plug 510 from the USB connection jack 520 and drags the USB connection plug on the screen to another desired application program displayed on the screen, the portable terminal may execute the desired application program selected by the user.

Figure 6:
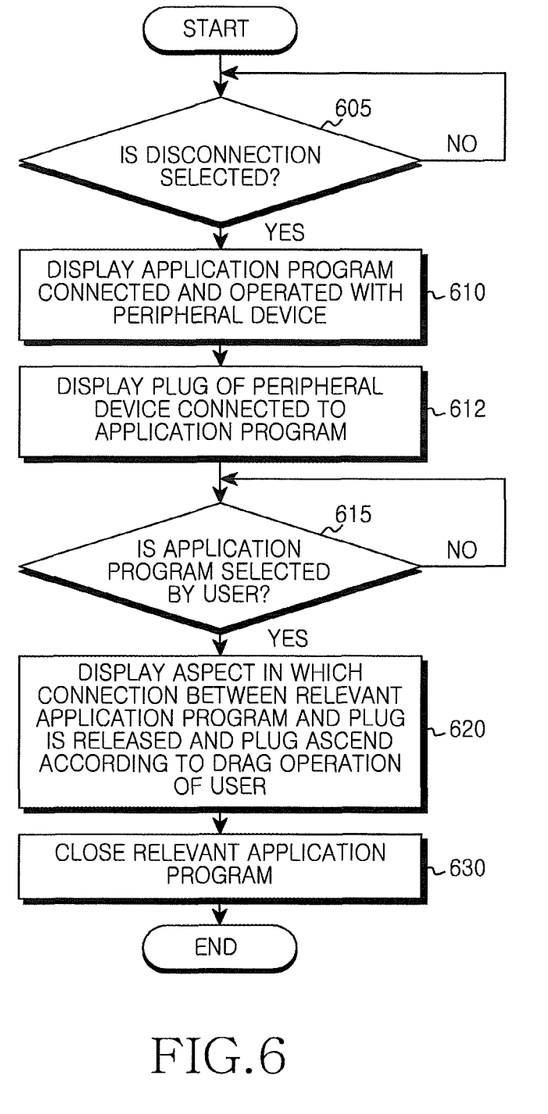
FIG. 6 is a high level flow diagram illustrating the operation of a process in a portable terminal for detaching a peripheral device according to an exemplary embodiment of the present disclosure.

FIG. 6 is a high level flow diagram illustrating the operation of a process in a portable terminal for detaching a peripheral device according to an exemplary embodiment of the present disclosure.

Referring to FIG. 6, when a peripheral device disconnection is selected by a user (step 605), the portable terminal displays an application program operating in connection with a peripheral device (step 610). Thereafter, the portable terminal displays a plug of the peripheral device connected to the application program (step 612).

Thereafter, when the user selects an application program to be closed (step 615) and drags up the plug to separate the plug from the application program to be closed, the portable terminal displays an aspect in which a connection between the application program and the plug is released and the plug ascends according to a drag operation of the user (step 620).

Thereafter, the portable terminal closes the application program (step 630).

In this case, when the user does not detach a peripheral device plug from a peripheral device connection jack and drags the plug to a desired application program, the portable terminal may execute the desired application program selected by the user.

Figure 7:
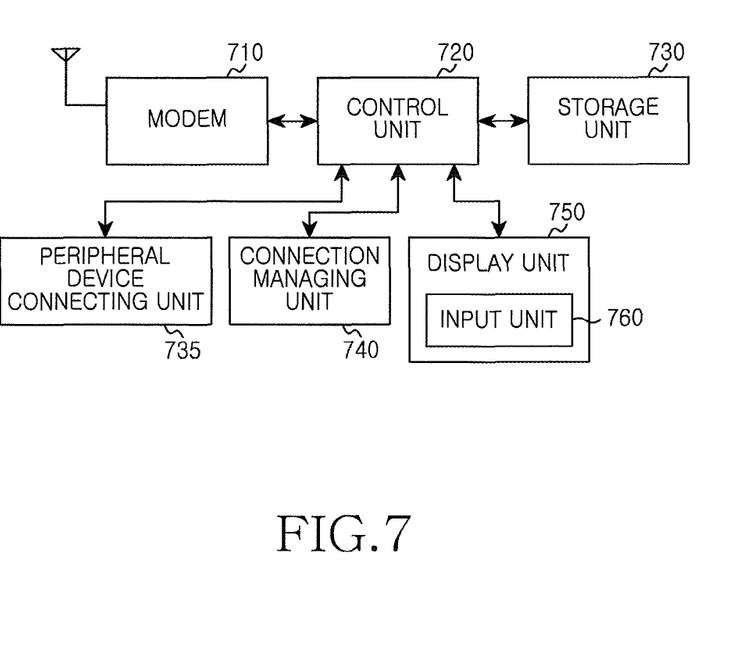
FIG. 7 is a block diagram depicting components of a portable terminal according to an exemplary embodiment of the present disclosure.

FIG. 7 is a block diagram illustrating a portable terminal according to an exemplary embodiment of the present disclosure. The user interface displays of FIGS. 1A through 1C, 2A through 2C, 4A through 4C and 5A through 5C may be displayed on the display of the portable terminal, and the processes of FIGS. 3 and 6 may be executed within the portable terminal.

Referring to FIG. 7, the portable terminal may include a modem 710, a control unit 720, a storage unit 730, a peripheral device connecting unit 735, a connection managing unit 740, a display unit 750, and an input unit 760.

The control unit 720 may include or control the connection managing unit 740.

The modem 710 may be used to communicate with another device. The modem 710 may include a wireless processing unit and a baseband processing unit. The wireless processing unit converts a signal received through an antenna into a baseband signal, and provides the baseband signal to the baseband processing unit. Also, the wireless processing unit converts a baseband signal received from the baseband processing unit into a wireless signal transmittable on a wireless channel, and transmits the wireless signal through the antenna.

The modem may use any wireless communication protocol that is currently in use.

The control unit 720 may control an overall operation of the portable terminal. In particular, the control unit 720 may manage the connection managing unit 740 according to the present disclosure.

The peripheral device connecting unit 735 may be used to connect a peripheral device (using a USB interface or a headset interface). The peripheral device connecting unit 735 may use a GPIO interface to attach or detach the peripheral device.

The storage unit 730 may store a program for controlling an overall operation of the portable terminal, and temporary data that are generated during execution of the program.

The display unit 750 may display an output of the control unit 720. A liquid crystal display (LCD) may be an example of the display unit 750.

The input unit 760 may be used to acquire a touch input. The input unit 760 may be located on the display unit 750 to provide the touch input to the control unit 720.

When detecting a peripheral attachment through the peripheral device connecting unit 735, the connection managing unit 740 may determine which peripheral device is connected through the peripheral device connecting unit 735.

Thereafter, the connection managing unit 740 may display a plug corresponding to the connected peripheral device on a screen. Thereafter, the connection managing unit 740 may display one or more application programs that are operable with the connected peripheral device.

Thereafter, when a user drags the displayed plug corresponding to the connected peripheral device to a desired application program, the connection managing unit may display the plug according to a drag operation of the user.

Thereafter, the connection managing, unit 740 may execute the application program that is selected through the drag operation of the user.

When a peripheral device disconnection is selected by the user, the connection managing unit 740 may display an application program operating in connection with a peripheral device. Thereafter, the connection managing unit 740 may display a plug of the peripheral device connected to the application program.

Thereafter, when the user selects an application program to be closed and drags up the plug to separate the plug from the application program to be closed, the connection managing unit 740 may display an aspect in which a connection between the application program and the plug is released and the plug ascends according to a drag operation of the user. Thereafter, the connection managing unit 740 may close the application program.

In this case, when the user does not detach a peripheral device plug from a peripheral device connection jack and drags the plug to a desired application program, the connection managing unit 740 may execute the desired application program selected by the user.

As described above, the subject matter of the present disclosure can provide a convenient and intuitive attachment/detachment of a peripheral device by using a graphical user interface.

While the subject matter of the present disclosure has been shown and described with reference to certain exemplary embodiments thereof, it will be understood by those skilled in the art that various changes in form and details may be made therein without departing from the spirit and scope of the disclosure as defined by the appended claims. Therefore, the scope of the disclosure is defined not by the above detailed description but by the appended claims, and all differences in scope will be construed as being included in the present disclosure.

What is claimed is:

1. A method in a mobile terminal including a touch screen, the method comprising:
    detecting a connection of an external device;
    displaying, on the touch screen, a plug image corresponding to the external device in response to the detecting of the connection of the external device;
    displaying, on the touch screen, one or more icons, respectively corresponding to one or more application programs that are executable on the mobile terminal, in response to the detecting of the connection of the external device;
    receiving a selection of one icon of the displayed one or more icons respectively corresponding to the one or more application programs; and
    executing an application program corresponding to the selected one icon,
    wherein the plug image is initially displayed at a portion of the touch screen adjacent to a location at which the external device is connected in response to the detecting of the connection.

2. The method of claim 1, wherein the detecting of the connection of the external device comprises using a general-purpose input/output (GPIO) interface or a universal serial bus interface.

3. The method of claim 1, wherein the receiving of the selection of the one icon of the displayed one or more icons comprises receiving a user input of a drag motion between the plug image corresponding to the external device and the selected one icon.

4. The method of claim 3, further comprising displaying the drag motion between the plug image corresponding to the external device and the selected one icon.

5. The method of claim 1, wherein the plug image is displayed as extending from a location of the external device connection.

6. A mobile terminal including a touch screen, the mobile terminal comprising:
    a connector; and
    a controller configured to:
        detect a connection of an external device through the connector;
        control the touch screen to display a plug image corresponding to the external device in response to the detecting of the connection of the external device;
        control the touch screen to display one or more icons, respectively corresponding to one or more application programs that are executable on the mobile terminal, in response to the detecting of the connection of the external device;
        receive a selection of one icon of the displayed one or more icons respectively corresponding to the one or more application programs; and
        execute an application program corresponding to the selected one icon,
    wherein the plug image is initially displayed at a portion of the touch screen adjacent to a location at which the external device is connected in response to the detecting of the connection.

7. The mobile terminal of claim 6, wherein the connector comprises a general-purpose input/output (GPIO) interface or a universal serial bus interface.

8. The mobile terminal of claim 6, wherein the controller is further configured to receive the selection of the one icon of the displayed one or more icons by receiving a user input of a drag motion between the plug image corresponding to the external device and the selected one icon.

9. The mobile terminal of claim 8, wherein the controller is further configured to control the touch screen to display the drag motion between the plug image corresponding to the external device and the selected one icon.

10. The mobile terminal of claim 6, wherein the plug image is displayed as extending from a location of the external device connector.

11. A method in a mobile terminal including a touch screen, the method comprising:
    detecting a connection of an external device;
    automatically displaying, at a location on the touch screen adjacent to the external device connection and in response to the detecting of the connection, a plug image corresponding to the external device;
    displaying, on the touch screen, one or more icons, respectively corresponding to one or more application programs that are executable on the mobile terminal, in response to the detecting of the connection of the external device;
    receiving a selection of one icon of the displayed one or more icons respectively corresponding to the one or more application programs; and
    executing an application program corresponding to the selected one icon.

12. The method of claim 11, wherein the detecting of the connection of the external device comprises using a general-purpose input/output (GPIO) interface or a universal serial bus interface.

13. The method of claim 11, wherein the receiving of the selection of the one icon of the displayed one or more icons comprises receiving a user input of a drag motion between the plug image corresponding to the external device and the selected one icon.

14. The method of claim 13, further comprising displaying the drag motion between the plug image corresponding to the external device and the selected one icon.

15. The method of claim 11, wherein the plug image is displayed as extending from a location of the external device connection.

16. A mobile terminal including a touch screen, the mobile terminal comprising:
a connector; and
a controller configured to:
    detect a connection of an external device;
    control the touch screen to automatically display, at a location on the touch screen adjacent to the external device connector and in response to the detecting of the connection, a plug image corresponding to the external device;
    control the touch screen to display one or more icons, respectively corresponding to one or more application programs that are executable on the mobile terminal, in response to the detecting of the connection of the external device;
    receive a selection of one icon of the displayed one or more icons respectively corresponding to the one or more application programs; and
    execute an application program corresponding to the selected one icon.

17. The mobile terminal of claim 16, wherein the external device connector comprises a general-purpose input/output (GPIO) interface or a universal serial bus interface.

18. The mobile terminal of claim 16, wherein the controller is further configured to receive the selection of the one icon of the displayed one or more icons by receiving a user input of a drag motion between the plug image corresponding to the external device and the selected one icon.

19. The mobile terminal of claim 18, wherein the controller is further configured to control the touch screen to display the drag motion between the plug image corresponding to the external device and the selected one icon.

20. The mobile terminal of claim 16, wherein the plug image is displayed as extending from a location of the external device connector.

* * * * *